United States Patent
Engel

(10) Patent No.: US 8,146,277 B2
(45) Date of Patent: Apr. 3, 2012

(54) MULTI-VIEW DISPLAY

(75) Inventor: Gabriel Damon Engel, Hamilton (NZ)

(73) Assignee: Puredepth Limited, Auckland (NZ)

( * ) Notice: Subject to any disclaimer, the term of this patent is extended or adjusted under 35 U.S.C. 154(b) by 661 days.

(21) Appl. No.: 10/528,334

(22) PCT Filed: Sep. 19, 2003

(86) PCT No.: PCT/NZ03/00215
§ 371 (c)(1),
(2), (4) Date: Mar. 13, 2006

(87) PCT Pub. No.: WO2004/036286
PCT Pub. Date: Apr. 29, 2004

(65) Prior Publication Data
US 2006/0191177 A1    Aug. 31, 2006

(30) Foreign Application Priority Data
Sep. 20, 2002    (NZ) .................................... 521505

(51) Int. Cl.
*G09F 19/14* (2006.01)
(52) U.S. Cl. .............................. 40/453; 345/4
(58) Field of Classification Search .............. 40/446, 40/453, 454; 345/4, 6
See application file for complete search history.

(56) References Cited

U.S. PATENT DOCUMENTS

| | | |
|---|---|---|
| 2,543,793 A | 3/1951 | Marks |
| 2,961,486 A | 11/1960 | Marks |
| 3,536,921 A | 10/1970 | Caulfield |
| 3,605,594 A | 9/1971 | Gerritsen |
| 3,622,224 A | 11/1971 | Wysocki et al. |
| 3,863,246 A * | 1/1975 | Trcka et al. ................ 345/102 |
| 3,891,305 A | 6/1975 | Fader |
| 3,918,796 A | 11/1975 | Fergason |
| 3,940,788 A | 2/1976 | Abe et al. |
| 3,955,208 A | 5/1976 | Wick et al. |
| 3,967,881 A | 7/1976 | Moriyama et al. |
| 3,992,082 A | 11/1976 | Katz |
| 4,153,654 A | 5/1979 | Maffitt et al. |
| 4,165,922 A | 8/1979 | Morrissy |
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |

(Continued)

FOREIGN PATENT DOCUMENTS
AU    82482/98    9/1998
(Continued)

OTHER PUBLICATIONS

"Clearboard 1991-1994," http://web.media.mit.edu/~ishii/CB.html.
(Continued)

*Primary Examiner* — Joanne Silbermann

(57) ABSTRACT

A multi view display (5) provides different viewing angles for different images (3, 4). The display (5) may comprise a single screen on which two or more images (3, 4) are interleaved, or a number of overlapping screens on which respective images (3, 4) are displayed. Viewing manipulation means such as privacy films or lenticular arrays control the viewing angles for each image (3, 4). The multiview display (5) may be used in a vehicle, to simultaneously display a movie (3) to a passenger (1), and a navigation image (3) to a driver (2).

21 Claims, 4 Drawing Sheets

U.S. PATENT DOCUMENTS

| | | |
|---|---|---|
| 4,333,715 A | 6/1982 | Brooks |
| 4,364,039 A | 12/1982 | Penz |
| 4,371,870 A | 2/1983 | Biferno |
| 4,423,929 A | 1/1984 | Gomi |
| 4,443,062 A | 4/1984 | Togashi et al. |
| 4,447,141 A | 5/1984 | Eisenkraft |
| 4,448,489 A | 5/1984 | Sato et al. |
| 4,472,737 A | 9/1984 | Iwasaki |
| 4,485,376 A | 11/1984 | Noble |
| 4,523,848 A | 6/1985 | Gorman et al. |
| 4,541,692 A | 9/1985 | Collins et al. |
| 4,556,286 A | 12/1985 | Uchida et al. |
| 4,562,433 A | 12/1985 | Biferno |
| 4,568,928 A | 2/1986 | Biferno |
| 4,613,896 A | 9/1986 | Takita et al. |
| 4,648,691 A | 3/1987 | Oguchi et al. |
| 4,649,425 A | 3/1987 | Pund |
| 4,670,744 A | 6/1987 | Buzak |
| 4,815,742 A | 11/1987 | Augustine |
| 4,712,869 A | 12/1987 | Claxton |
| 4,734,295 A | 3/1988 | Liu |
| 4,736,214 A | 4/1988 | Rogers |
| 4,757,626 A | 7/1988 | Weinreich |
| 4,768,300 A * | 9/1988 | Rutili .................... 40/546 |
| 4,792,850 A | 12/1988 | Liptoh et al. |
| 4,927,240 A | 5/1990 | Stolov et al. |
| 4,947,257 A | 8/1990 | Fernandez et al. |
| 5,032,007 A | 7/1991 | Silverstein et al. |
| 5,046,826 A | 9/1991 | Iwamoto et al. |
| 5,046,827 A | 9/1991 | Frost et al. |
| 5,049,870 A | 9/1991 | Fitzgerald et al. |
| 5,050,965 A | 9/1991 | Conner et al. |
| 5,075,993 A | 12/1991 | Weinreich |
| 5,086,354 A | 2/1992 | Bass et al. |
| 5,091,720 A | 2/1992 | Wood |
| 5,107,352 A | 4/1992 | Fergason |
| 5,112,121 A | 5/1992 | Chang et al. |
| 5,113,272 A | 5/1992 | Reamey |
| 5,124,803 A | 6/1992 | Troxel |
| 5,132,839 A | 7/1992 | Travis |
| 5,132,878 A | 7/1992 | Carey |
| 5,198,936 A | 3/1993 | Stringfellow |
| 5,255,028 A | 10/1993 | Biles |
| 5,255,356 A | 10/1993 | Michelman et al. |
| 5,261,404 A | 11/1993 | Mick et al. |
| 5,283,560 A | 2/1994 | Bartlett |
| 5,289,297 A | 2/1994 | Bollman et al. |
| 5,298,892 A | 3/1994 | Shapiro et al. |
| 5,300,942 A | 4/1994 | Dolgoff |
| 5,302,946 A | 4/1994 | Shapiro et al. |
| 5,317,686 A | 5/1994 | Salas et al. |
| 5,333,255 A | 7/1994 | Damouth |
| 5,337,181 A | 8/1994 | Kelly |
| 5,361,165 A | 11/1994 | Stringfellow et al. |
| 5,367,801 A | 11/1994 | Ahn |
| 5,369,450 A | 11/1994 | Haseltine et al. |
| 5,396,429 A | 3/1995 | Hanchett |
| 5,416,890 A | 5/1995 | Beretta |
| 5,416,895 A | 5/1995 | Anderson et al. |
| 5,418,898 A | 5/1995 | Zand et al. |
| 5,432,626 A | 7/1995 | Sasuga et al. |
| 5,463,724 A | 10/1995 | Anderson et al. |
| 5,465,101 A | 11/1995 | Akiba et al. |
| 5,473,344 A | 12/1995 | Bacon et al. |
| 5,475,812 A | 12/1995 | Corona et al. |
| 5,479,185 A | 12/1995 | Biverot |
| 5,502,805 A | 3/1996 | Anderson et al. |
| 5,515,484 A | 5/1996 | Sfarti et al. |
| 5,537,233 A | 7/1996 | Miura et al. |
| 5,557,684 A | 9/1996 | Wang et al. |
| 5,999,191 A | 9/1996 | Frank et al. |
| 5,583,674 A | 12/1996 | Mosley |
| 5,585,821 A | 12/1996 | Ishikura et al. |
| 5,589,980 A | 12/1996 | Bass et al. |
| 5,590,259 A | 12/1996 | Anderson et al. |
| 5,600,462 A | 2/1997 | Suzuki et al. |
| 5,600,765 A | 2/1997 | Ando et al. |
| 5,604,854 A | 2/1997 | Glassey |
| 5,623,591 A | 4/1997 | Cseri |
| 5,638,501 A | 6/1997 | Gough et al. |
| 5,648,789 A | 7/1997 | Beadles et al. |
| 5,651,107 A | 7/1997 | Frank et al. |
| 5,663,746 A | 9/1997 | Pellenberg et al. |
| 5,664,127 A | 9/1997 | Anderson et al. |
| 5,675,755 A | 10/1997 | Trueblood |
| 5,689,316 A | 11/1997 | Hattori et al. |
| 5,694,150 A | 12/1997 | Sigona et al. |
| 5,694,532 A | 12/1997 | Carey et al. |
| 5,695,346 A * | 12/1997 | Sekiguchi et al. ............ 434/365 |
| 5,706,139 A | 1/1998 | Kelly |
| 5,721,847 A | 2/1998 | Johnson |
| 5,729,219 A | 3/1998 | Armstrong et al. |
| 5,745,197 A | 4/1998 | Leung et al. |
| 5,751,385 A | 5/1998 | Heinze |
| 5,757,522 A | 5/1998 | Kulick et al. |
| 5,764,317 A | 6/1998 | Sadovnik et al. |
| 5,772,446 A | 6/1998 | Rosen |
| 5,796,455 A | 8/1998 | Mizobata et al. |
| 5,796,509 A | 8/1998 | Doany et al. |
| 5,805,163 A | 9/1998 | Bagnas |
| 5,805,171 A | 9/1998 | St. Clair et al. |
| 5,813,742 A | 9/1998 | Gold et al. |
| 5,822,021 A | 10/1998 | Johnson et al. |
| 5,825,436 A | 10/1998 | Kinght |
| 5,828,420 A | 10/1998 | Marshall et al. |
| 5,831,615 A | 11/1998 | Drews et al. |
| 5,835,088 A | 11/1998 | Jaaskelainen, Jr. |
| 5,838,308 A | 11/1998 | Knapp et al. |
| 5,880,742 A | 3/1999 | Rao et al. |
| 5,883,623 A | 3/1999 | Cseri |
| 5,883,627 A | 3/1999 | Pleyer |
| 5,883,635 A | 3/1999 | Rao et al. |
| 5,890,174 A | 3/1999 | Khanna et al. |
| 5,923,307 A | 7/1999 | Hogle, IV |
| 5,924,870 A * | 7/1999 | Brosh et al. .................. 434/365 |
| 5,956,180 A | 9/1999 | Bass et al. |
| 5,963,197 A | 10/1999 | Bacon et al. |
| 5,976,297 A | 11/1999 | Oka et al. |
| 5,982,417 A | 11/1999 | Blonde |
| 5,990,990 A | 11/1999 | Crabtree |
| 6,005,654 A | 12/1999 | Kipfer et al. |
| 6,016,385 A | 1/2000 | Yee et al. |
| 6,018,379 A | 1/2000 | Mizobata et al. |
| 6,031,530 A | 2/2000 | Trueblood |
| 6,037,937 A | 3/2000 | Beaton et al. |
| 6,054,969 A | 4/2000 | Haisma |
| 6,057,814 A | 5/2000 | Kalt |
| 6,061,110 A | 5/2000 | Hisatake et al. |
| 6,067,137 A | 5/2000 | Ohnishi et al. |
| 6,072,489 A | 6/2000 | Gough et al. |
| 6,075,531 A | 6/2000 | DeStefano |
| 6,085,202 A | 7/2000 | Rao et al. |
| 6,097,361 A | 8/2000 | Rohner |
| 6,100,862 A | 8/2000 | Sullivan |
| 6,111,614 A | 8/2000 | Mugura et al. |
| 6,114,814 A | 9/2000 | Shannon et al. |
| 6,118,427 A | 9/2000 | Buxton et al. |
| 6,122,103 A | 9/2000 | Perkins et al. |
| 6,141,067 A | 10/2000 | Ikka |
| 6,147,741 A | 11/2000 | Chen et al. |
| 6,163,318 A | 12/2000 | Fukuda et al. |
| 6,181,349 B1 | 1/2001 | Bardon et al. |
| 6,204,902 B1 | 3/2001 | Kim et al. |
| 6,215,490 B1 | 4/2001 | Kaply |
| 6,215,538 B1 | 4/2001 | Narutaki et al. |
| 6,215,898 B1 | 4/2001 | Woodfill et al. |
| 6,239,852 B1 | 5/2001 | Oono et al. |
| 6,246,407 B1 | 6/2001 | Wilks et al. |
| 6,269,173 B1 | 7/2001 | Hsien |
| 6,282,551 B1 | 8/2001 | Anderson et al. |
| 6,287,712 B1 | 9/2001 | Bulovic et al. |
| 6,300,990 B1 | 10/2001 | Yamaguchi et al. |
| 6,717,728 B2 | 10/2001 | Putilin |
| 6,317,128 B1 | 11/2001 | Harrison et al. |
| 6,326,738 B1 | 12/2001 | McAndrew |
| 6,327,592 B1 | 12/2001 | Yoshikawa |
| 6,341,439 B1 * | 1/2002 | Lennerstad .................... 40/453 |

| | | |
|---|---|---|
| 6,351,298 B1 | 2/2002 | Mitsui et al. |
| 6,356,281 B1 | 3/2002 | Isenman |
| 6,369,830 B1 | 4/2002 | Brunner et al. |
| 6,377,229 B1 | 4/2002 | Sullivan |
| 6,377,306 B1 | 4/2002 | Johnson et al. |
| 6,388,648 B1 | 5/2002 | Clifton et al. |
| 6,392,725 B1 | 5/2002 | Harada et al. |
| 6,412,953 B1 | 7/2002 | Tiao et al. |
| 6,414,728 B1 | 7/2002 | Faris et al. |
| 6,418,426 B1 | 7/2002 | Schlesinger |
| 6,438,515 B1 | 8/2002 | Crawford et al. |
| 6,443,579 B1 | 9/2002 | Myers |
| 6,466,185 B2 | 10/2002 | Sullivan et al. |
| 6,468,157 B1 | 10/2002 | Hinami et al. |
| 6,489,044 B1 | 12/2002 | Chen et al. |
| 6,496,832 B2 | 12/2002 | Chi et al. |
| 6,504,587 B1 | 1/2003 | Morishita et al. |
| 6,505,209 B1 | 1/2003 | Gould et al. |
| 6,512,559 B1 | 1/2003 | Hashimoto et al. |
| 6,515,881 B2 | 2/2003 | Chou et al. |
| 6,525,699 B1 | 2/2003 | Suyama et al. |
| 6,538,660 B1 | 3/2003 | Celi, Jr. et al. |
| 6,557,999 B1 | 5/2003 | Shimizu |
| 6,562,440 B1 | 5/2003 | Tsuchiya et al. |
| 6,573,961 B2 | 6/2003 | Jiang et al. |
| 6,578,985 B1 | 6/2003 | Seraphim et al. |
| 6,587,094 B2 | 7/2003 | Anderson |
| 6,587,118 B1 | 7/2003 | Yoneda |
| 6,590,605 B1 | 7/2003 | Eichenlaub |
| 6,593,904 B1 * | 7/2003 | Marz et al. ............... 345/87 |
| 6,610,102 B1 | 8/2003 | Aldred et al. |
| 6,639,349 B1 | 10/2003 | Bahadur |
| 6,661,425 B1 | 12/2003 | Hiroaki |
| 6,679,613 B2 | 1/2004 | Mabuchi |
| 6,693,692 B1 | 2/2004 | Kaneko et al. |
| 6,697,135 B1 | 2/2004 | Baek et al. |
| 6,720,961 B2 | 4/2004 | Tracy |
| 6,721,713 B1 | 4/2004 | Guheen et al. |
| 6,725,422 B1 | 4/2004 | Bauchot et al. |
| 6,760,003 B1 | 7/2004 | Sase |
| 6,771,327 B2 | 8/2004 | Sekiguchi |
| 6,812,649 B2 | 11/2004 | Kim |
| 6,845,578 B1 * | 1/2005 | Lucas ..................... 40/427 |
| 6,859,907 B1 | 2/2005 | McGarry |
| 6,897,855 B1 | 5/2005 | Matthies et al. |
| 6,906,762 B1 | 6/2005 | Witehira et al. |
| 6,940,507 B2 | 9/2005 | Repin et al. |
| 6,947,024 B2 | 9/2005 | Lee et al. |
| 6,958,748 B1 | 10/2005 | Fukui et al. |
| 7,072,095 B2 | 7/2006 | Liang et al. |
| 7,113,188 B2 | 9/2006 | Kuroda et al. |
| 7,205,355 B2 | 4/2007 | Liang et al. |
| 7,262,752 B2 | 8/2007 | Weindorf |
| 7,352,424 B2 | 4/2008 | Searle |
| 7,372,447 B1 | 5/2008 | Jacobsen et al. |
| 2001/0026625 A1 | 10/2001 | Azima et al. |
| 2001/0040652 A1 | 11/2001 | Hayashi |
| 2002/0001055 A1 | 1/2002 | Kimura et al. |
| 2002/0012369 A1 | 1/2002 | Nasu et al. |
| 2002/0027608 A1 | 3/2002 | Johnson et al. |
| 2002/0047601 A1 | 4/2002 | Shannon et al. |
| 2002/0064037 A1 | 5/2002 | Lee |
| 2002/0067373 A1 | 6/2002 | Roe et al. |
| 2002/0075211 A1 | 6/2002 | Nakamura |
| 2002/0091728 A1 | 7/2002 | Kjaer et al. |
| 2002/0093516 A1 | 7/2002 | Brunner et al. |
| 2002/0105516 A1 | 8/2002 | Tracy |
| 2002/0111195 A1 | 8/2002 | Kweon et al. |
| 2002/0126115 A1 | 9/2002 | Ijntema |
| 2002/0154102 A1 | 10/2002 | Huston |
| 2003/0043106 A1 | 3/2003 | Woo |
| 2003/0069074 A1 | 4/2003 | Jackson |
| 2003/0090455 A1 | 5/2003 | Daly |
| 2003/0132895 A1 | 7/2003 | Berstis |
| 2003/0184665 A1 | 10/2003 | Berstis |
| 2004/0012708 A1 | 1/2004 | Matherson |
| 2004/0239582 A1 | 12/2004 | Seymour |
| 2005/0062897 A1 | 3/2005 | Lei |
| 2005/0146787 A1 | 7/2005 | Lukyanitsa |
| 2006/0103951 A1 | 5/2006 | Bell et al. |
| 2006/0227249 A1 | 10/2006 | Chen et al. |

FOREIGN PATENT DOCUMENTS

| | | |
|---|---|---|
| AU | 25542/99 | 9/1999 |
| BE | 1011678 | 12/1999 |
| CA | 2020372 | 1/1991 |
| CA | 2075807 | 8/1991 |
| CA | 2104294 | 8/1992 |
| CA | 2139696 | 7/1995 |
| CA | 2320694 | 8/1999 |
| CA | 2329702 | 9/1999 |
| CA | 2345128 | 3/2000 |
| CN | 1201157 | 12/1998 |
| CN | 1293805 | 5/2001 |
| CN | 1294695 | 5/2001 |
| CN | 1356584 | 7/2002 |
| CN | 1369997 | 9/2002 |
| DE | 2730785 | 1/1979 |
| DE | 19757378 | 7/1998 |
| DE | 29912074 | 11/1999 |
| DE | 19920789 | 5/2000 |
| DE | 19916747 | 10/2000 |
| DE | 19920789 | 5/2005 |
| EP | 76651 | 4/1983 |
| EP | 0 195 584 | 9/1986 |
| EP | 409188 | 7/1989 |
| EP | 0 336 351 | 10/1989 |
| EP | 454423 | 10/1991 |
| EP | 0460314 | 12/1991 |
| EP | 0573433 | 9/1992 |
| EP | 662669 | 1/1994 |
| EP | 595387 | 5/1994 |
| EP | 0605945 | 7/1994 |
| EP | 0703563 | 3/1996 |
| EP | 0732669 | 9/1996 |
| EP | 0935191 | 8/1999 |
| EP | 1057070 | 8/1999 |
| EP | 1058862 | 9/1999 |
| EP | 1116070 | 3/2000 |
| EP | 1155351 | 8/2000 |
| EP | 1046944 | 10/2000 |
| EP | 1177527 | 11/2000 |
| EP | 1081774 | 3/2001 |
| EP | 1093008 | 4/2001 |
| EP | 0733927 | 7/2001 |
| EP | 1231757 | 8/2002 |
| EP | 1271944 | 1/2003 |
| EP | 1923860 | 5/2008 |
| FR | 2609941 | 7/1988 |
| GB | 1 448 520 | 9/1976 |
| GB | 2107482 | 4/1983 |
| GB | 2145897 | 4/1985 |
| GB | 2245092 | 12/1991 |
| GB | 2312584 | 10/1997 |
| GB | 2314943 | 1/1998 |
| GB | 2347003 | 8/2000 |
| GB | 2372618 | 8/2002 |
| JP | 49096628 | 1/1973 |
| JP | 56-7916 | 1/1981 |
| JP | 57-119389 | 7/1982 |
| JP | 60024502 | 2/1985 |
| JP | 60-103895 | 6/1985 |
| JP | 60-122920 | 7/1985 |
| JP | 60211830 | 10/1985 |
| JP | 60-233684 | 11/1985 |
| JP | 60-244924 | 12/1985 |
| JP | 61-166524 | 7/1986 |
| JP | 61-200783 | 9/1986 |
| JP | 61-248083 | 11/1986 |
| JP | 62-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-65795 | 3/1988 |
| JP | 63-100898 | 5/1988 |

| | | |
|---|---|---|
| JP | 63-158587 | 7/1988 |
| JP | 63-203088 | 8/1988 |
| JP | 63-274918 | 8/1988 |
| JP | 63-318856 | 12/1988 |
| JP | 1-229591 | 9/1989 |
| JP | 2-90127 | 3/1990 |
| JP | 2-262119 | 10/1990 |
| JP | 03-002835 | 1/1991 |
| JP | 3021902 | 1/1991 |
| JP | 3-101581 | 4/1991 |
| JP | 3148622 | 6/1991 |
| JP | 3174580 | 7/1991 |
| JP | 3-226095 | 10/1991 |
| JP | 3-233548 | 10/1991 |
| JP | 3226095 | 10/1991 |
| JP | 4-034521 | 2/1992 |
| JP | 4-034595 | 2/1992 |
| JP | 04-107540 | 4/1992 |
| JP | 4191755 | 7/1992 |
| JP | 5-007373 | 1/1993 |
| JP | 5040449 | 2/1993 |
| JP | 5-091545 | 4/1993 |
| JP | 5-142515 | 6/1993 |
| JP | 6-233328 | 8/1994 |
| JP | 6-274305 | 9/1994 |
| JP | 6274305 | 9/1994 |
| JP | 6-314181 | 11/1994 |
| JP | 63-039299 | 11/1994 |
| JP | 6317488 | 11/1994 |
| JP | 63-39299 | 12/1994 |
| JP | 7-44349 | 2/1995 |
| JP | 8-076139 | 3/1995 |
| JP | 7146473 | 6/1995 |
| JP | 07-198921 | 8/1995 |
| JP | 07-198942 | 8/1995 |
| JP | 7-209573 | 8/1995 |
| JP | 7-222202 | 8/1995 |
| JP | 8-036375 | 2/1996 |
| JP | 8030388 | 2/1996 |
| JP | 8036375 | 2/1996 |
| JP | 8-83160 | 3/1996 |
| JP | 8095741 | 4/1996 |
| JP | 08335043 | 12/1996 |
| JP | 09-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 09211392 | 8/1997 |
| JP | 9-230825 | 9/1997 |
| JP | 9244057 | 9/1997 |
| JP | 9-282357 | 10/1997 |
| JP | 9282357 | 10/1997 |
| JP | 10003355 | 1/1998 |
| JP | 10039782 | 2/1998 |
| JP | 10105829 | 4/1998 |
| JP | 10228347 | 8/1998 |
| JP | 10-260784 | 9/1998 |
| JP | 10232304 | 9/1998 |
| JP | 10-301508 | 11/1998 |
| JP | 10-312033 | 11/1998 |
| JP | 10-334275 | 12/1998 |
| JP | 11-066306 | 3/1999 |
| JP | 11-202793 | 7/1999 |
| JP | 11-205822 | 7/1999 |
| JP | 9308769 | 7/1999 |
| JP | 11205822 | 7/1999 |
| JP | 11272846 | 10/1999 |
| JP | 2000-111940 | 4/2000 |
| JP | 2000-113988 | 4/2000 |
| JP | 2000-347645 | 12/2000 |
| JP | 2001-56410 | 2/2001 |
| JP | 2001-100689 | 4/2001 |
| JP | 2000-99237 | 10/2001 |
| JP | 2001324608 | 11/2001 |
| JP | 2002014772 | 1/2002 |
| JP | 2002-504764 | 2/2002 |
| JP | 2002504764 | 2/2002 |
| JP | 2001-215332 | 4/2002 |
| JP | 2002-097269 | 4/2002 |
| JP | 2002-099223 | 4/2002 |
| JP | 2002-131775 | 5/2002 |
| JP | 2002146087 | 5/2002 |
| JP | 2001-42310 | 8/2002 |
| JP | 2001-56675 | 9/2002 |
| JP | 2002-258284 | 9/2002 |
| JP | 2002-271819 | 9/2002 |
| JP | 2002-287144 | 10/2002 |
| JP | 2002-350772 | 12/2002 |
| JP | 2002544544 | 12/2002 |
| JP | 2003-015555 | 1/2003 |
| JP | 2003-507774 | 2/2003 |
| JP | 200350774 | 2/2003 |
| JP | 2003075963 | 3/2003 |
| JP | 2003186894 | 7/2003 |
| JP | 2002-099223 | 10/2003 |
| JP | 2003282586 | 10/2003 |
| JP | 2003-316335 | 11/2003 |
| JP | 2002-156608 | 12/2003 |
| JP | 2004220691 | 8/2004 |
| JP | 2004251219 | 9/2004 |
| JP | 2007006827 | 1/2007 |
| JP | 20090146751 | 7/2009 |
| JP | 20090192233 | 8/2009 |
| JP | 9-244057 | 12/2010 |
| NL | 1005868 | 10/1997 |
| NO | 20005178 | 4/2001 |
| NZ | 505801 | 8/2002 |
| NZ | 505800 | 9/2002 |
| PL | 343229 | 4/2001 |
| WO | 88/05389 | 7/1988 |
| WO | 91/12554 | 8/1991 |
| WO | 91/15930 | 10/1991 |
| WO | 92/09003 | 5/1992 |
| WO | 92/15170 | 9/1992 |
| WO | 96/27992 | 9/1996 |
| WO | 97/14987 | 4/1997 |
| WO | 98/04087 | 1/1998 |
| WO | 98/16869 | 4/1998 |
| WO | 98/47106 | 10/1998 |
| WO | 99/42889 | 8/1999 |
| WO | 99/44095 | 9/1999 |
| WO | 00/17708 | 3/2000 |
| WO | 00-36578 | 6/2000 |
| WO | 00/36578 | 6/2000 |
| WO | 00-48167 | 8/2000 |
| WO | 00/48167 | 8/2000 |
| WO | 00/49453 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | 01/57799 | 8/2001 |
| WO | 01/95019 | 12/2001 |
| WO | 02/35277 | 5/2002 |
| WO | 02/084637 | 10/2002 |
| WO | 03/003109 | 1/2003 |
| WO | 03032058 | 4/2003 |
| WO | 2004001488 | 12/2003 |
| WO | 2004/001488 | 1/2004 |
| WO | 2004/102520 | 11/2004 |
| WO | 2004102520 | 11/2004 |
| WO | 03/032058 | 12/2010 |

OTHER PUBLICATIONS

"Teamworkstation 1989-1994," http://web.media.mit.edu/~ishii/TWS.html.
"Textarc: An Alternate Way to View a Text," http://textarc.org.
"Textarc: NYSCA Grant and Public Installation," http"//textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.

Office Action U.S. Appl. No. 10/048,966 May 2, 2007.
Office Action U.S. Appl. No. 10/048,966 May 3, 2006.
Office Action U.S. Appl. No. 10/048,966 Jul. 14, 2005.
Office Action U.S. Appl. No. 10/048,966 Aug. 18, 2006.
Office Action U.S. Appl. No. 10/049,271 Feb. 5, 2005.
Office Action U.S. Appl. No. 10/049,271 Feb. 8, 2006.
Office Action U.S. Appl. No. 10/049,271 Mar. 2, 2007.
Office Action U.S. Appl. No. 10/049,271 May 18, 2005.
Office Action U.S. Appl. No. 10/049,271 Aug. 23, 2006.
Office Action U.S. Appl. No. 10/049,271 Nov. 17, 2004.
Office Action U.S. Appl. No. 10/049,272 Jan. 23, 2006.
Office Action U.S. Appl. No. 10/049,272 Mar. 25, 2008.
Office Action U.S. Appl. No. 10/049,272 May 21, 2007.
Office Action U.S. Appl. No. 10/049,272 Jul. 13, 2005.
Office Action U.S. Appl. No. 10/049,272 Jul. 26, 2004.
Office Action U.S. Appl. No. 10/049,272 Aug. 28, 2006.
Office Action U.S. Appl. No. 10/049,272 Oct. 12, 2007.
Office Action U.S. Appl. No. 10/049,272 Nov. 29, 2004.
Office Action U.S. Appl. No. 10/049,272 Dec. 14, 2007.
Office Action U.S. Appl. No. 10/049,272 Dec. 31, 2003.
Office Action U.S. Appl. No. 10/416,885 Jun. 15, 2006.
Office Action U.S. Appl. No. 10/416,885 Nov. 2, 2005.
Office Action U.S. Appl. No. 10/475,432 Feb. 1, 2006.
Office Action U.S. Appl. No. 10/475,432 Feb. 26, 2007.
Office Action U.S. Appl. No. 10/475,432 Jul. 28, 2006.
Office Action U.S. Appl. No. 10/475,432 Sep. 27, 2005.
Office Action U.S. Appl. No. 10/475,432 Oct. 5, 2007.
Office Action U.S. Appl. No. 10/475,432 Dec. 20, 2007.
Office Action U.S. Appl. No. 10/476,590 Mar. 3, 2006.
Office Action U.S. Appl. No. 10/476,590 Apr. 19, 2007.
Office Action U.S. Appl. No. 10/476,590 Oct. 6, 2006.
Office Action U.S. Appl. No. 10/476,590 Oct. 16, 2007.
Office Action U.S. Appl. No. 10/489,101 Mar. 29, 2006.
Office Action U.S. Appl. No. 10/489,101 Jul. 16, 2007.
Office Action U.S. Appl. No. 10/489,101 Jul. 28, 2005.
Office Action U.S. Appl. No. 10/489,101 Nov. 22, 2005.
Office Action U.S. Appl. No. 10/492,624 Aug. 1, 2007.
Office Action U.S. Appl. No. 10/508,726 Jun. 1, 2007.
Office Action U.S. Appl. No. 10/508,726 Sep. 21, 2007.
Office Action U.S. Appl. No. 10/508,726 Dec. 11, 2006.
Office Action U.S. Appl. No. 10/519,285 Sep. 10, 2007.
Office Action U.S. Appl. No. 10/841,133 Jan. 8, 2007.
Office Action U.S. Appl. No. 10/841,133 Sep. 6, 2007.
Office Action U.S. Appl. No. 10/841,133 Nov. 28, 2007.
Office Action U.S. Appl. No. 11/402,847 Jan. 14, 2008.
Office Action U.S. Appl. No. 11/402,847 Jun. 04, 2007.
Office Action U.S. Appl. No. 11/402,847 Sep. 12, 2007.
Office Action U.S. Appl. No. 11/402,847 Nov. 16, 2006.
Office Action U.S. Appl. No. 10/048,638; Mail Date Jun. 6, 2008.
Office Action U.S. Appl. No. 10/048,966; Mail Date Sep. 18, 2007.
Office Action U.S. Appl. No. 10/049,271; Mail Date Feb. 5, 2008.
Office Action U.S. Appl. No. 10/049,271; Mail Date Aug. 5, 2008.
Office Action U.S. Appl. No. 10/049,272; Mail Date Aug. 13, 2008.
Office Action U.S. Appl. No. 10/049,272; Mail Date Dec. 24, 2008.
Office Action U.S. Appl. No. 10/475,432; Mail Date Aug. 28, 2008.
Office Action U.S. Appl. No. 10/476,590; Mail Date Feb. 28, 2008.
Office Action U.S. Appl. No. 10/476,590; Mail Date Jun. 19, 2008.
Office Action U.S. Appl. No. 10/476,590; Mail Date Oct. 29, 2008.
Office Action U.S. Appl. No. 10/492,624; Mail Date Jan. 5, 2009.
Office Action U.S. Appl. No. 10/492,624; Mail Date Aug. 1, 2007.
Office Action U.S. Appl. No. 10/508,726; Mail Date May 1, 2008.
Office Action U.S. Appl. No. 10/841,133; Mail Date Aug. 7, 2008.
Office Action U.S. Appl. No. 10/519,285; Mail Date Feb. 2, 2009.
Office Action U.S. Appl. No. 10/519,285; Mail Date May 28, 2008.
Office Action U.S. Appl. No. 10/519,285; Mail Date Sep. 17, 2008.
"Kodak Datashow HR/M Projection Pad", Motion Picture & Audiovisual Products, Eastman Kodak Co., 1988.
Alampiev et al., "Technology of the Three Dimensional Electronic Matrix for Liquid Crystal Display" Jan. 1, 1976.
Blundell et al., "Volumetric Three-Dimensional Display Systems", pp. 1-7.
Buzak, "CRT Displays Full-color 3-D Images".
Cole, et al.; "A Three-Dimensional Display for Radar Returns", pp. 52-53.
General Electric, "3-D Liquid Crystal Display for Mine Detecting Radar" Apr. 1, 1974.
Hattori, T. et al,; "Spatial Modulation Display Using Spatial Light Modulators", Optical Engineering, vol. 31, No. 2, pp. 350-352, (Feb. 1992).
L.F. Hodges et al., "True Three-Dimensional CRT-Based Displays,"Infor. Display, pp. 18-22 (May 1987).
Tamura et al., "Multilayer 3-D Display Adapter", Applied Optics, vol. 17, No. 23, pp. 3695-3696 (Dec. 1, 1978).
Technical Report of the Institute of Television Engineers of Japan, vol. 20, No. 5, Feb. 1996.
Tomohiko Hattori et al: "Spatial Light Modulators" Optical Engineering, vol. 31, No. 2, Feb. 1, 1992, pp. 350-352.
Final OA Dated Dec. 24, 2008; U.S. Appl. No. 10/049,272.
Final OA Dated Mar. 18, 2009; U.S. Appl. No. 10/048,966.
Final OA Dated Mar. 23, 2009; U.S. Appl. No. 10/476,590.
Non Final OA Dated Feb. 2, 2009; U.S. Appl. No. 10/519,285.
Non Final OA Dated Jan. 5, 2009; U.S. Appl. No. 10/492,624.
Non Final OA Dated Apr. 29, 2009; U.S. Appl. No. 10/521,413.
Non Final OA Dated Apr. 14, 2009; U.S. Appl. No. 10/475,432.
Translated Japanese Office Action Jul. 7, 2008—Provided to show relevance of the following references: JP 49-25387, JP 52-130340, JP 58-108574, JP 58-137880, JP 60-209781, JP 62-250477.
Office Action Mailed Oct. 8, 2010; U.S. Appl. No. 10/492,624.
Final Office Action Mailed Aug. 30, 2010; U.S. Appl. No. 10/521,413.
Non-Final Office Action Mailed Oct. 12, 2010; U.S. Appl. No. 10/557,157.
Final Office Action Mailed Oct. 27, 2010; U.S. Appl. No. 11/804,650.
Office Action Mailed Jul. 9, 2010; U.S. Appl. No. 12/046,265.
Non-Final Office Action Mailed Oct. 22, 2010; U.S. Appl. No. 12/107,589.
Non-Final Office Action Mailed Sep. 13, 2010; U.S. Appl. No. 12/606,728.
Office Action Dated Feb. 15, 2011; U.S. Appl. No. 10/492,624.
Notice of Allowance Dated Mar. 19, 2010; U.S. Appl. No. 10/049,272.
Non-Final Office Action Dated Aug. 14, 2009; U.S. Appl. No. 10/049,272.
Notice of Allowance Dated Mar. 8, 2010; U.S. Appl. No. 10/048,966.
Final Office Action Dated Feb. 8, 2011; U.S. Appl. No. 12/606,728.
Notice of Allowance Dated Aug. 4, 2011; U.S. Appl. No. 12/046,265.
Notice of Allowance Dated Apr. 14, 2011; U.S. Appl. No. 12/046,265.
Final Office Action Dated Dec. 14, 2010; U.S. Appl. No. 12/046,265.
Examiner'S Answer Dated May 25, 2011; U.S. Appl. No. 10/521,413.
Non-Final Office Action Dated Apr. 29, 2010; U.S. Appl. No. 10/521,413.
Final Office Action Dated Jun. 1, 2011; U.S. Appl. No. 10/519,285.
Non-Final Office Action Dated Dec. 10, 2010; U.S. Appl. No. 10/519,285.
Final Office Action Dated May 24, 2010; U.S. Appl. No. 10/519,285.
Non-Final Office Action Dated Jan. 11, 2010; U.S. Appl. No. 10/519,285.
Notice of Allowance Dated Mar. 9, 2010; U.S. Appl. No. 10/508,726.
Non-Final Office Action Dated Jul. 25, 2011; U.S. Appl. No. 12/765,670.
Final Office Action Dated Mar. 21, 2011; U.S. Appl. No. 12/107,589.
Final Office Action Dated Jun. 25, 2010; U.S. Appl. No. 12/107,589.
Non-Final Office Action Dated Feb. 16, 2010; U.S. Appl. No. 12/107,589.
Notice of Allowance Dated Jul. 29, 2011; U.S. Appl. No. 10/557,157.
Final Office Action Dated Apr. 26, 2011; U.S. Appl. No. 10/557,157.
Final Office Action Dated Apr. 15, 2010; U.S. Appl. No. 10/557,157.
Non-Final Office Action Dated Sep. 19, 2009; U.S. Appl. No. 10/557,157.
Notice of Allowance Dated Feb. 22, 2010; U.S. Appl. No. 10/475,432.
Notice of Allowance Dated Aug. 11, 2011; U.S. Appl. No. 10/492,624.

Non-Final Office Action Dated Jun. 22, 2010; U.S. Appl. No. 10/492,624.
Final Office Action Dated Feb. 5, 2010; U.S. Appl. No. 10/492,624.
Non-Final Office Action Dated Jun. 22, 2009; U.S. Appl. No. 10/492,624.
Notice of Allowance Dated Oct. 12, 2011; U.S. Appl. No. 10/476,590.
Notice of Allowance Dated Jun. 13, 2011; U.S. Appl. No. 10/476,590.
Notice of Allowance Dated Feb. 3, 2011; U.S. Appl. No. 10/476,590.
Notice of Allowance Dated Oct. 18, 2010; U.S. Appl. No. 10/476,590.
Non-Final Office Action Dated Jun. 1, 2010; U.S. Appl. No. 10/476,590.
Non-Final Office Action Dated Feb. 26, 2010; U.S. Appl. No. 10/476,590.
Non-Final Office Action Dated Sep. 4, 2009; U.S. Appl. No. 10/476,590.
Notice of Allowance Dated Oct. 17, 2011; U.S. Appl. No. 12/089,390.
Non-Final Office Action Dated May 14, 2010; U.S. Appl. No. 11/804,650.

* cited by examiner

MULTI-VIEW DISPLAY

RELATED APPLICATIONS

This application is a National Stage of International Application No. PCT/NZ2003/000215, filed Sep. 19, 2003, which published in English, and which claims priority to New Zealand patent application no. 521505, filed Sep. 20, 2002. The entire disclosure of the International Application No. PCT/NZ2003/000215 is incorporated herein by reference.

TECHNICAL FIELD

This invention related to the field of electronic information display.

BACKGROUND ART

In-car navigation systems and in-car entertainment systems are available as an accessory in new cars, or are available separately for retrofit, commonly called after market sales. The displays for the systems are placed in or on top of the car dash board. Since the displays are typically of the wide-viewing angle colour liquid crystal type, both the front passenger and the driver may see the display. The display may be supplied with information so that it forms part of the car's navigation system or part of the entertainment system at any one time. If an in-car entertainment system is fitted in view of the driver, the video component such as television and DVD must be disabled whilst the car is in motion, so not to distract the driver who is responsible for the safety of the vehicle. This is federally mandated safety requirement in many countries and is somewhat of a disadvantage as it is desirable for the front passenger, and only the front passenger, to view in-car entertainment. In practice many owners disable this safety feature resulting in potentially fatal distraction for the driver. However, it is also useful for the driver view the in-car navigation system whilst the vehicle is moving. With present systems this would interrupt the passenger's entertainment. A potential solution would be to supply separate displays to the passenger and driver, however this is increases expense and takes up almost double the area restricting design flexibility of the dash board control canter and reducing the space available for peripheral devices and storage space.

Long aeroplane flights are particularly boring for passengers. Airlines have attempted to alleviate this boredom by including projector systems on the aeroplanes to supply information about the journey and entertainment. However with a single projector system the entertainment is the same for each passenger, and there is no accounting for individual taste or interest. This problem has been alleviated in some aeroplanes with separate displays for each passenger, however a display for each passenger generally increases expense requires individual displays to be quite small, and can add significant weight to the plane increasing costs for airlines.

It is the object of the present invention specifically to allow a passenger to view full entertainment features such as television and movies on the same display device that a driver can view navigation information without conflict between images and thus to reduce components, reduce complexity, reduce driver distraction, and increase passenger enjoyment. To do this one requires to control the viewing angle of a display. There exist various methods to do this.

Certain environments such as kiosks or ATM's require privacy. Privacy film or filters are common in the market place which reduce the viewing angle in which the viewer can only see the displayed images within a certain angle—typically directly in front of the display. A simple solution for a privacy screen is to laminate a view control film onto a screen. 3M are well known for producing these products which control the position from where the display can be viewed. The two most common types of privacy film are light control film and blur film. Light control film acts like Venetian blinds. If the observer were to stand at 60' to the front of these blinds the view would be blocked by the sides of the 'louvers'. However when the observer stands directly in front of the 'blinds' the display is viewable. Holographic diffusion film works by dispersing the incident light at particular angles and transmitting it at all other angles. The display appearance changes from translucent to transparent depending on the viewing angle.

A prismatic film or 'image directing film' can be used to direct the image displayed on a display device. The film rakes the image created by a flat panel display and redirects it to the optimum viewing angle, generally through refraction.

Parallax barrier methods and lenticular lenses can also be used to direct light.

Viewing angle can also be controlled by the liquid crystal itself. Viewing angle, which is in the same direction as the maximum contrast, can be controlled by the liquid crystal cell structure itself. The contrast ratio is defined as the ratio of maximum luminance to the minimum luminance. Since the retardation experienced by the ray traversing at the midlayer tilt angle is the lowest in this direction in a normally black panel, the luminance in this direction is lower resulting in a lower contrast ratio. Both the azimuth and tilt of this angle can be controlled by changing the azimuth and tilt angle on the alignment layers respectively. See Liquid Crystal Displays by Ernst Lueder, Wily/SID series in display technology incorporated herein by way of reference.

At present there exist methods to produce displays where several imaging planes are stacked with set distances between them. These imaging planes may also be stacked as closely as possible. In a preferred embodiment these displays consist of a high-brightened backlight, and multiple image planes including but limited to a background image panel and a front image plane, which are parallel and physically separate and generally are laminated to form a stack. There are generally colour filter stripes, and a matrix on each display which defined the borders of the pixels and a method of eliminated moire interference. The following discussion applies to all image planes that are addressed by passive or active matrices or have filters arranged in any periodic pattern but not limited to those described above.

The viewing angle of liquid crystal displays can be controlled by the orientation of the liquid crystal molecules with respect to the glass substrates that form the display. Optimum Viewing angle here means the direction a viewers looks in where the display contrast, the ratio between the luminance of the light and dark states of the display, is at a maximum. Orientation here is defined as a three-tuple where each element gives the magnitude of the angle between the x, y and z axes respectively where the x, y and z axes are aligned parallel with the horizontal, vertical and normal directions of the display respectively.

It has previously been considered undesirable for displays to have a narrow viewing angle because this prohibits multiple users from viewing the same image. However in the case of a car navigation and entertainment system it would be desirable for the driver to be able to see navigation information, and only navigation information and the passenger to see entertainment, and only entertainment. For safety, space and cost constraints it would be useful for both passengers to have different images views from the same display.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

Accordingly in a first aspect of the present invention may broadly be said to consist in a multi view display for viewing different images at specified viewing angles comprising a multi view display comprising:
  i) a display layer for the display of images;
  ii) an un-braiding viewing angle manipulation means which manipulates the viewing angle of the images displayed on said display layer;
such that when at least two images are be interlaced and displayed on said display layer, each constituent image of the interlaced image is presented at the viewing angle or viewing angles as determined by the un-braiding viewing angle manipulation means.

Preferably two images will be presented to the viewer or viewers at different viewing angles using the present invention. Those images are interlaced and displayed on the display layer. The images are interlaced in such a way that the un-braiding viewing angle manipulation means separates out or 'unbraids' the constituent images in said interlaced image and presents said constituent images at different viewing angles. Using this technique, the observer will see one of the constituent images from one viewing angle and other constituent images from other viewing angles. While this specification refers to the presentation of two images this should not be seen as limiting. Those skilled in the art will appreciate that greater numbers of images can be interlaced and subsequently displayed to various viewing angles.

The term viewing angle manipulation means should be interpreted to mean any device used to direct light in certain directions or prevent light from proceeding in certain directions, this includes wide angle diffusers, privacy film, image or optical directing film.

The term un-braiding viewing angle manipulation means is preferably an adapted viewing angle manipulation means such as a privacy film, image directing film or compensation film. Typically this will involve interlacing at least two viewing angle manipulation means which direct light at different angles. For example by interlacing two image directing films of which have different refraction angles to each other, the film will be capable (when applied to an interlaced image, which is interlaced consistently with the interlaced image directing films) of directing images to two different viewing angles.

The term viewing angle as used here in should be interpreted as relating to the angle at which images displayed on a display device or pixel are viewable some a wide viewing angles may close to 100% or 180 degrees. Typically narrower viewing angles will be used to narrow the angles from which images can be viewed.

Throughout this specification reference is made to privacy film or image directing film or other viewing angle manipulation means. However this should not be seen as limiting. Those skilled in the art will appreciate that any means of directing images to viewing angles can be used with the present invention.

In the present invention, the unbraiding viewing angle manipulation means has the ability to present images displayed on the display device to different viewing angles. This can be achieved by interlacing two different image directing films each of which is designed to present images to a viewing angles angle which is different to the other interlaced privacy film.

The interlacing of images and their display needs to be consistent with the un-braiding viewing angle manipulation means used. In the case of two images which are interlaced, two optical viewing films with different viewing angles to each other will be used with corresponding interlacing between the unbraiding viewing angle manipulation means and the interlaced image displayed.

Preferably each of the at least two interlaced images are presented to a different viewing angles than the other image (s).

Accordingly in a further aspect of the present invention may broadly be said to consist in a multi view display for viewing different images at specified viewing angles comprising a multi view display comprising,
  an adapted display layer for the display of images wherein said adapted display layer comprises, at least two different specified viewing angle pixels which are interlaced,
such that when at least two images are interlaced and displayed on said adapted display layer, each constituent image of the interlaced image is presented to the viewing angle or viewing angles as determined by the viewing angle of the interlaced specified viewing angle pixels.

The term 'specified viewing angle pixel' as used herein should be interpreted to include a pixel which is produced to have a defined viewing angle; that is the contrast ratio of the pixel is optimal for a certain scope of viewing angle. The control of viewing angle of a pixel is found commonly in the market. For example displays which are intended to be located higher than the intended viewer have a viewing angle pointing down.

Different specified viewing angle pixels which have different viewing angles are interlaced within the adapted display layer. Preferably two images will be presented to the viewer or viewers. Those images are interlaced and displayed on the adapted display layer. The images are interlaced in such a way that the specified viewing angle pixels separate out or 'unbraids' the constituent images the interlaced image displayed on the adapted display layer and presents the constituent images at different viewing angles. Using this technique, the observer will see one of the constituent images from one viewing angle and:the other constituent image from another viewing angle.

Accordingly in a further aspect of the present invention may broadly be said to consist in a multi view display for viewing different images at specified viewing angles comprising a multi view display comprising:
i) an adapted display layer for the display of images wherein said adapted display layer comprises:
ii) at least two different specified viewing angle pixels which are interlaced
iii) an un-braiding viewing angle manipulation means;
such that when at least two images are interlaced and displayed on said adapted display layer, each constituent image of the interlaced image is presented to the viewing angle or viewing angles as determined by the viewing angle of the interlaced specified viewing angle pixels in combination with the unbraiding viewing angle manipulation means.

In this embodiment the combination of a manipulation means preferably an interlaced privacy film or light directing means is used in combination with interlaced specified viewing angle pixels. The combination of these mechanisms allows greater control of the viewing angle to which images are presented.

Accordingly in a further aspect of the present invention may be broadly said to consist in a multi-layer multi view display for displaying different images at specified viewing angles comprising:
i) at least two display layers for the display of images, said display layers being substantially planar and at least in part overlapping, wherein display layer(s) overlapping another display layer are selectively transparent;
ii) an un-braiding viewing angle manipulation means acting upon at least one of the display layers and thereby manipulating the viewing angle of images displayed on the display layer(s) behind it;
such that when at least two images are be interlaced and a display layer which the un-braiding viewing angle manipulation means is acting upon, each constituent image of the interlaced image displayed on said layer(s) (which the un-braiding viewing angle manipulation means is acting upon) is presented at the viewing angle or viewing angles as determined by the un-braiding viewing angle manipulation means.

In one preferred embodiment of the present invention the display device is made up of a two layered multi-layer display, being backlit, with each layer being selectively transparent. In between those layers an interlaced lens with a triangle strip pattern with particular viewing angles acting as a viewing angle manipulation means acts on the rear most layer. The interlaced lens allows the constituent images of an interlaced image displayed on the rear screen to be seen from the viewing angles specified by the interlaced lens.

A conventional non-layered, non-compensated colour liquid crystal display, contrast ratio decreases until to a crossover point at which the image inverts when viewed from outside the optimal viewing angle. This results in images being "washed out" and beyond the cut-off point these colours invert completely with black changing to white.

In the multi-layered setup used in a multi view display as described here-in the display is required to be transparent. Hence in a real life scenario—the multi-layered multi view display is used in a car—if the driver was looking at the rear image layer with a viewing direction of about 60 degrees in the plane perpendicular to the floor and parallel with the horizontal and with the front image layer with an optimal viewing direction of −60 degrees in said plane then the driver will be able to see the image on the rear image layer and not on the from image layer. Conversely, the passenger, sitting to the other side of the display, can see only information from the front image layer. Hence the passenger can view entertainment only and the drive can view navigation only. Thus limited viewing angle, which was previously considered as a disadvantage in the industry, combined with multiple layered displays can be used to multiplex images to multiple viewers which is an unexpected advantage.

Accordingly in a further aspect of the present invention may be broadly said to consist in a multi-layer multi view display for displaying different images at specified viewing angles comprising:
at least two display layers for the display of images, said display layers being substantially planar and at least in part overlapping, wherein display layer(s) overlapping another display layer are selectively transparent;
where in at least one of the display layers is an adapted display layer comprising pixels which are specified viewing angle pixels;
such that images displayed on the at least one adapted display layer will be presented to the viewing angle of the specified viewing angle pixels.

Preferably the images displayed on the at least one adapted display layer have a different viewing angle to the images displayed on the other (non-adapted) display layer(s).

In a preferred embodiment of the present invention the display device is made up of a two layered multi-layer display, being backlit, with each layer being selectively transparent. Both display layers are adapted display layers, having specified viewing angle pixels where the viewing angle of each of the two layers is opposite such that a viewer from the left will see the image displayed one layer and a observer from the right will see the image displayed on the other layer.

Accordingly in a further aspect of the present invention may be broadly said to consist in a multi-layer multi view display for displaying different images at specified viewing angles comprising:
i) at least two display layers for the display of images, said display layers being substantially planar and at least in part overlapping, wherein display layer(s) that are overlapping another display layer are selectively transparent,
ii) a viewing angle manipulation means with a wide viewing angle acting upon at least one display and being located behind at least one display,
such that images displayed upon display layers that the viewing angle manipulation means is acting on are presented to the viewing angle determined by the viewing angle manipulation means.

In a preferred embodiment two display layers are overlapped and transparent and are backlit. The front layer has a narrow viewing angle to the left (from the viewer's perspective) behind this is a further narrow viewing angle display but acting upon it is a wide angle diffusion refractor. Hence the images displayed on the rear layer are viewable from a wide viewing angle and the images displayed on the front layer are viewed only from the left (and are viewed as being layered on top of images displayed on the back layer). The diffusing refractor will assist in overcoming the moire interference arising as a result of layering two like substrates.

Accordingly in a further aspect of the present invention may be broadly said to consist in a multi-layer multi view display for displaying different images at specified viewing angles comprising:
at least two display layers for the display of images, said display layers being substantially planar and at least in part overlapping, wherein display layer(s) that are overlapping another display layer are selectively transparent,
wherein at least one of the display layers is an adapted display layer comprising of at least two different specified viewing angle pixels which are interlaced, and all layers to the rear of that adapted display layer (if any) are adapted display layers and also comprising at least one an un-braiding viewing angle manipulation means acting upon the adapted the display layer(s) behind it, such that when at least two images are interlaced and displayed on said adapted display layer, each constituent image of the interlaced image is presented to the viewing angle as determined by the viewing angle of the interlaced specified viewing angle pixels in combination with the unbraiding viewing angle manipulation means.

Preferably the multi view display is adapted to receive images from a CPU or other image transferring device such as a DVD or video playback.

Accordingly a further aspect of the present invention comprises a method of operating a multi view display said multi view display having at least two viewing angles characterised by the steps of displaying each images intended for each viewing to the display layer which presents that image to the intended viewing angle.

Accordingly a further aspect of the present invention comprises display software adapted to facilitate the display of images using multi view display said multi view display having at least two viewing angles said display software being adapted to execute the steps of transmitting each images intended for each viewing to the display layer which presents that image to the intended viewing angle:

Accordingly a further aspect of the present invention comprises a method of operating a multi view display said multi view display comprising at Least two multi layered display layers characterised by the steps of:

i) displaying interlaced images on display layers on which an un-braiding viewing angle manipulation means acts
  ii) displaying non-interlaced images on any display layers (if any) on which no un-braiding viewing angle manipulation means acts.

Accordingly a further aspect of the present invention comprises display software adapted to facilitate the display of images using a multi view display said multi view display comprising at least two multi layered display layers, said display software being adapted to execute the steps of:

i) transmitting interlaced images to display layer(s), said display layer(s) having an un-braiding viewing angle manipulation means acting upon it (them), said interlaced image being acted upon by said un-braiding viewing angle manipulation means to present the constituent images of the interlaced image to differing viewing angles, and
  ii) transmitting (non-interlaced) image data to display layers (if any) on which no unbraiding viewing angle manipulation means acts said image data being used by said display components to display a images to the viewing angle inherent to said display layer.

The display layer used in the invention specified in this can be any kind of display device capable of meeting the needs of the embodiment—such as interlacing of pixels or transparency in the case of a multi layered embodiment such display device can be an Liquid Crystal Display (LCD), an Organic Light Emitting Diode Display (OLED) or any other type of display.

Reference throughout this specification is made the present invention as applying to video display systems. However, it should be appreciated by those skilled in the art that other types of display and imaging systems may be used in conjunction with the invention, not necessarily being video screens such as but not limited to hand held or arcade video games, desktop computers, security monitors, process control system monitors.

BRIEF DESCRIPTION OF DRAWINGS

Further aspects of the present invention will become apparent from the following deposition which is given by way of example only and with reference to the accompanying drawings in which.

BEST MODES FOR CARRYING OUT THE INVENTION

Figure 1:
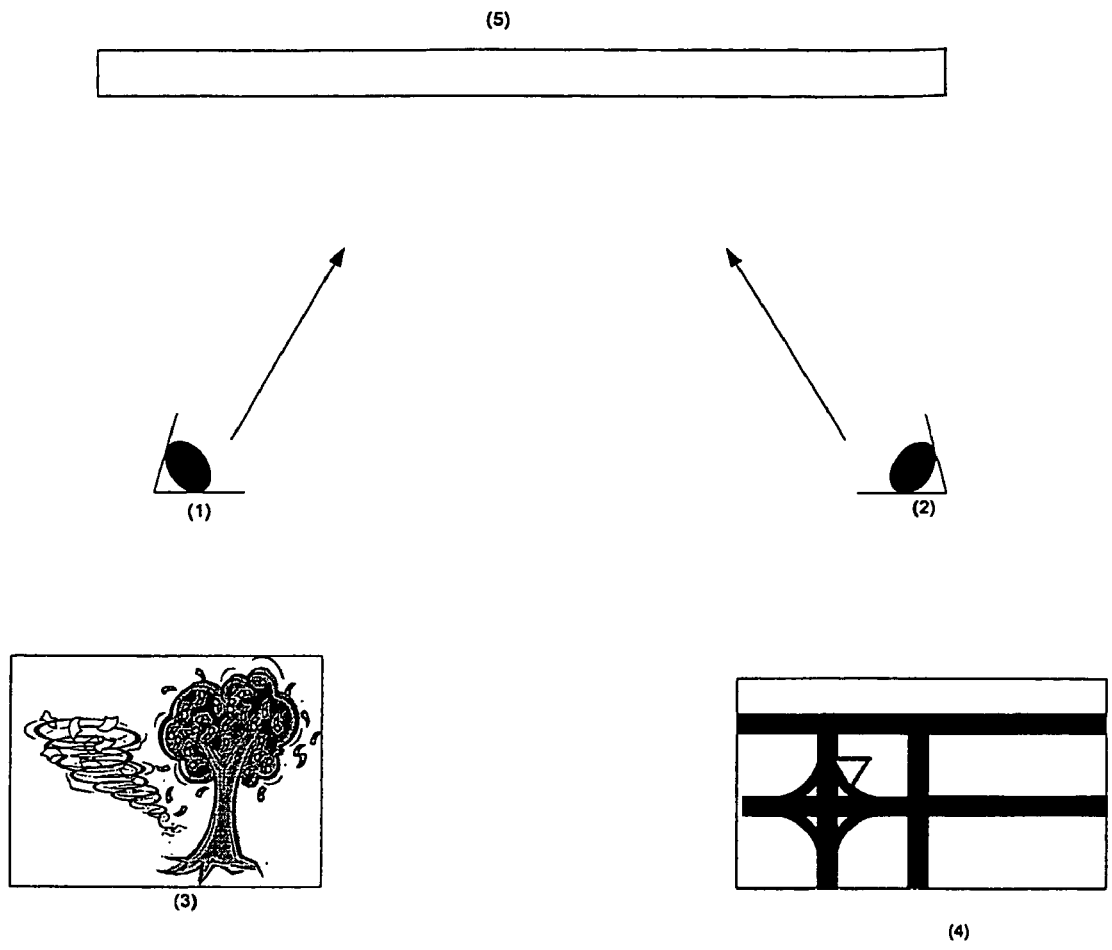
FIG. 1: Is a diagrammatic view of a combined in-car navigation and entertainment display. A viewer (1) looking at the display (5) in the direction shown sees a movie being played (3), whilst a viewer (2) looking at the display in the direction shown sees the navigation system (4).
Figure 2:
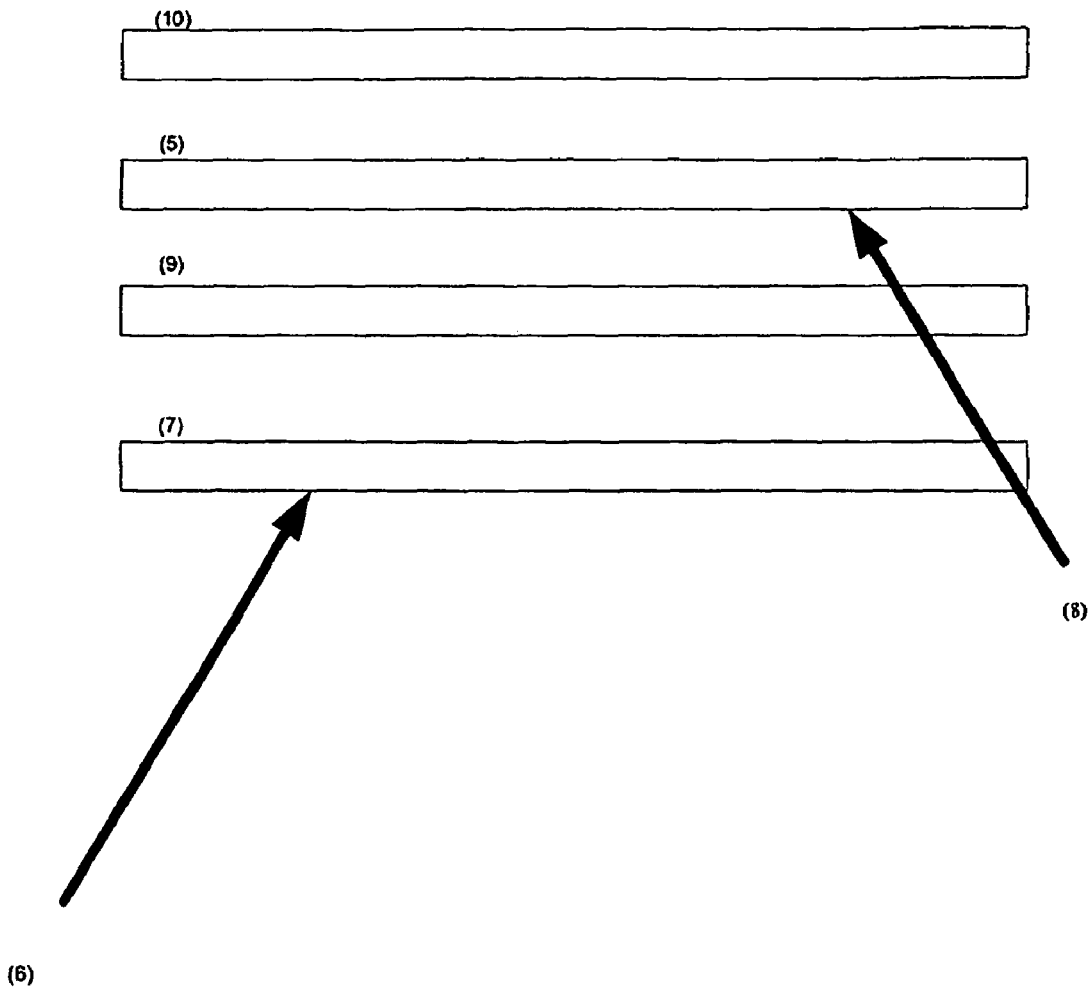
FIG. 2: Shows a diagrammatic view of the multi-layered embodiment where an image (3) is displayed on the first layer (5) with an optimum viewing direction (6) and an image (4) is displayed on the second layer (7) with an optimum viewing direction (8).
Figure 3:
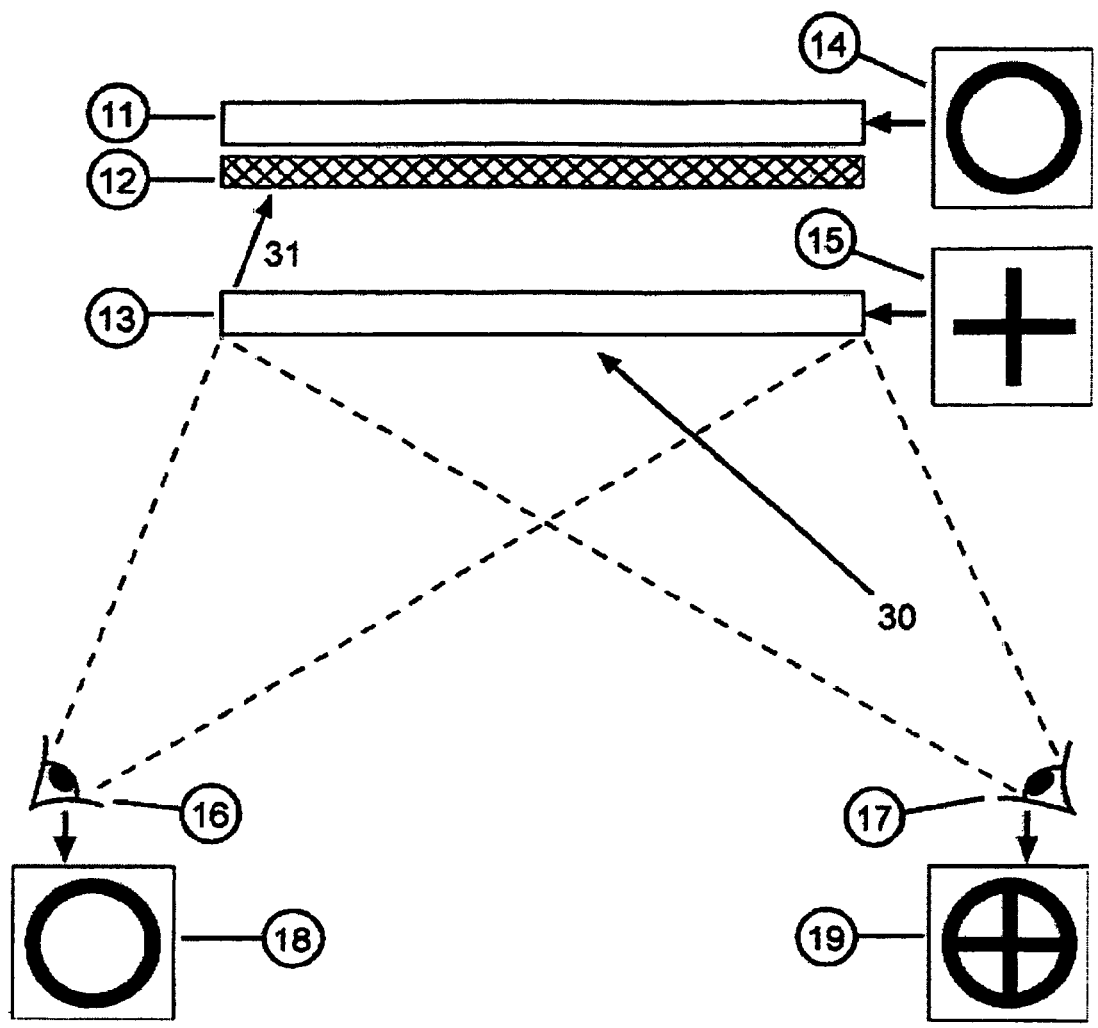
FIG. 3: Is a diagrammatic view of a multi-layer multi view embodiment of the present invention in which the front layer is viewable only by one observer and the rear layer is viewable by both observers.

In a first preferred embodiment a single layer display is used to at least two different images or display contents each image/display-content being presented to a different viewing angle to the images/display-content.

Figure one illustrates single layer multi view display used as an in-car navigation/entertainment device. A viewer (1) looking at the display (5) in the direction shown sees a movie being played (3), whilst a second viewer (2) looking at the display in the direction shown sees the image of a navigation system (4). In this embodiment the display layer (5) is adapted such that it comprises interlaced pixels of two different viewing angles. The movie is displayed on pixels of one viewing angle and the navigation images are displayed on pixels of the other viewing angle.

In a further preferred embodiment a multi-layered multi view device is used to display at least two different images or display contents each image/display-content being presented to a different viewing angle to the images/display-content.

Figure two illustrates a combined in-car navigation and entertainment display. A first layer with optimum viewing direction (6) is placed substantially collinear and as close to a second layer with an optimum viewing direction (8). In most cases there will be a diffusion layer (9) to abate moire interference. The displays can be back lit using either direct view lamps or a light pipe (10). A viewer viewing at an angle (6) will see image (3), and a viewer looking in direction (8) will see image (4).

In a further preferred embodiment a multi-layered multi view device is used to display layered images to one viewer and a single image to another viewer.

Figure illustrates a multi layered multi view device. An image (15) is displayed on the first layer (13) with an optimum viewing direction (30) and an image (14) is displayed on a second layer (11) through a viewing angle enhancer (12)

which expands the viewing angle (31) of second layer (11) with an optimum viewing angle of (31), such that a viewer (17) inline with the viewing angle of the first layer (30) would see a combined image.(19) with the image (14) from the second layer (11) would appear at distance behind the image (15) from the first layer (13) and such that a second simultaneous viewer (16) outside the viewing angle (30) of the fist layer would see an image (18) only represented by the second layer (11).

Figure 4:
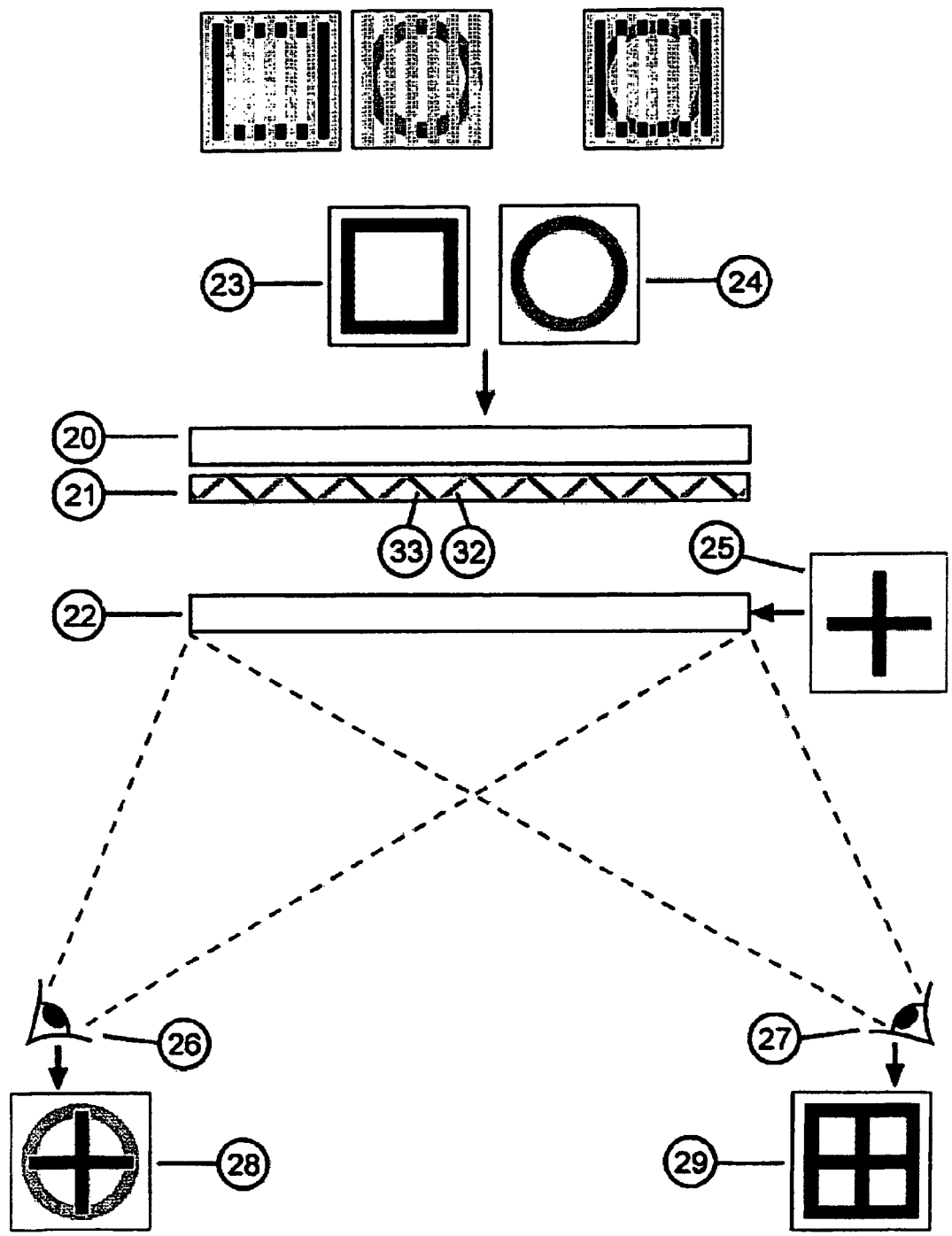
FIG. 4: Is a diagrammatic view of a multi-layer multi view embodiment of the present invention in which the front display layer is viewable by both observers and two interlaced images displayed on the rear display layer are presented to different observers.

In a further preferred embodiment a multi-layered multi view device is used in combination with an interlaced optical film or lens FIG. 4 illustrates a diagrammatic view of the multi-layered privacy embodiment where image (25) is displayed on the first layer (22) and multiple images (23, 24) are displayed on the back layer (20) such that the images are interlaced to match a lens stripe pattern (21) allowing a viewer (29) in position inline with pattern (32) matching the image (23) on the rear layer (20) Would see a composite image (29) compromising the foreground image (25) in front of a background image (23) that is aligned with the viewers (27) position, while allowing a second simultaneous viewer in position inline with a pattern (33) matching the image (24) on the rear layer (20) would see a composite image (28) compromising the foreground image (25) in front of a background image (24) that is aligned with the viewer's position.

Aspects of the present invention have been described by way of example only and it should be appreciated that modifications and additions' may be made thereto without departing from the scope thereof.

What I claim is:

1. A multi-component display comprising:
a first display screen comprising a first plurality of pixels, wherein said first display screen is operable to display a first image using said first plurality of pixels; and
a second display screen comprising a second plurality of pixels, wherein said second display screen is operable to display a second image using said second plurality of pixels, wherein said first and second display screens overlap, and wherein said second display screen is further operable to display said second image for viewing from a first viewing angle and contemporaneously for reducing visibility of said second image from a second viewing angle.

2. The multi-component display of claim 1, wherein said second display screen further comprises a third plurality of pixels, wherein said second display screen is further operable to display a third image using said third plurality of pixels, and wherein said second display screen is further operable to display said third image for viewing from said second viewing angle and further for reducing visibility of said third image from said first viewing angle.

3. The multi-component display of claim 2, wherein said second and third plurality of pixels are interlaced.

4. The multi-component display of claim 1 further comprising:
a first optical component for manipulating images displayed by said second display screen, wherein said first optical component is further operable to reduce visibility of said second image from said second viewing angle, and wherein said wherein said first optical component is further operable to reduce visibility of a third image from said first viewing angle.

5. The multi-component display of claim 4, wherein said first optical component is disposed between said first and second display screens.

6. The multi-component display of claim 4, wherein said first optical component is selected from a group consisting of a privacy film, an image directing film, an optical directing film, and a lens including a lens stripe pattern.

7. The multi-component display of claim 1 further comprising:
a viewing angle enhancer for enabling viewing of said first image from said first and second viewing angles.

8. The multi-component display of claim 7, wherein said viewing angle enhancer is selected from a group consisting of a diffuser and a refractor.

9. A multi-component display comprising:
a first display screen comprising a first plurality of pixels, wherein said first display screen is operable to display a first image using said first plurality of pixels; and
a second display screen comprising a second plurality of pixels, wherein said second display screen is operable to display a second image using said second plurality of pixels, wherein said first and second display screens overlap; and
an optical component for manipulating images displayed by said second display screen, wherein said optical component is further operable to enable viewing of said second image from a first viewing angle and contemporaneously operable to reduce visibility of said second image from a second viewing angle, and wherein said optical component is disposed between said first and second display screens.

10. The multi-component display of claim 9, wherein said optical component is selected from a group consisting of a privacy film, an image directing film, an optical directing film, and a lens including a lens stripe pattern.

11. The multi-component display of claim 9, wherein said second display screen further comprises a third plurality of pixels, wherein said second display screen is further operable to display a third image using said third plurality of pixels, and wherein said optical component is further operable to enable viewing of said third image from said second viewing angle, and wherein said optical component is further operable to reduce visibility of said third image from said first viewing angle.

12. The multi-component display of claim 11, wherein said second and third plurality of pixels are interlaced.

13. A multi-component display comprising:
a first display screen comprising a first plurality of pixels, wherein said first display screen is operable to display a first image using said first plurality of pixels; and
a second display screen comprising a second plurality of pixels, wherein said second display screen is operable to display a second image using said second plurality of pixels, wherein said first and second display screens overlap, wherein said second display screen is further operable to display said second image in a first plurality of regions of said second display screen, wherein said second display screen is further operable to display a third image in a second plurality of regions of said second display screen, wherein said first and second plurality of regions are interlaced, wherein said second image is visible from a first range of viewing angles, and wherein said third image is visible from a second range of viewing angles.

14. The multi-component display of claim 13, wherein said second range of viewing angles includes at least one viewing angle which is different from said first range of viewing angles.

15. The multi-component display of claim 13, wherein said second display screen further comprises a third plurality of pixels, and wherein said second display screen is further operable to display said third image using said third plurality of pixels.

16. The multi-component display of claim 15, wherein said third plurality of pixels are associated with said second plurality of regions and comprise directional pixels operable to reduce visibility of said third image from said first range of viewing angles, and wherein said second plurality of pixels are associated with said first plurality of regions and comprise directional pixels operable to reduce visibility of said second image from said second range of viewing angles.

17. The multi-component display of claim 13 further comprising:
   a first optical component for manipulating images displayed by said second display screen, wherein said first optical component is further operable to reduce visibility of said second image from said second range of viewing angles, and wherein said wherein said first optical component is further operable to reduce visibility of said third image from said first range of viewing angles.

18. The multi-component display of claim 17, wherein said first optical component is disposed between said first and second display screens.

19. The multi-component display of claim 17, wherein said first optical component is selected from a group consisting of a privacy film, an image directing film, an optical directing film, and a lens including a lens stripe pattern.

20. The multi-component display of claim 13 further comprising:
   a viewing angle enhancer for enabling viewing of said first image from said first and second ranges of viewing angles.

21. The multi-component display of claim 20, wherein said viewing angle enhancer is selected from a group consisting of a diffuser and a refractor.

* * * * *